3,258,318
ETCHED METAL FOIL FOR ELECTROLYTIC CAPACITORS AND THE LIKE CONSISTING OF SILVER-ALUMINUM ALLOYS
Wolfgang Gruhl, Bad Godesberg, Germany, assignor to Rheinische Blattmetall Aktiengesellschaft, Grevenbroich, Lower Rhine, Germany
No Drawing. Filed Sept. 3, 1964, Ser. No. 394,354
Claims priority, application Germany, Sept. 10, 1963, R 36,087
2 Claims. (Cl. 29—183)

The present invention relates to etched metal foils for electrolytic capacitors and the like, and more particularly, to etched metal foils for formed electrodes of electrolytic capacitors which consist predominantly of high purity aluminum.

The term "high purity aluminum" is to denote aluminum having a purity of at least 99.99%.

Such electrode foils for electrolytic capacitors are prior to formation of the electrode subjected to a roughening process by etching. Thereby, the effective electrode surface is enlarged and this in turn will increase the capacitance. Conventionally, the roughening is accomplished by chemical etching with dilute solutions of strong acids, however, it is also possible to carry out the roughening in an electro-chemical process. It is desired to obtain the highest possible etch ratio. The term "etch ratio" is defined by the capacitance per unit area of the etched foil divided by the capacitance per unit area of the plain (unetched) foil after both foils have been subjected to formation (of the oxide film) under equal conditions.

It has been proposed to alloy the aluminum of the foil with less noble metals such as sodium, potassium, calcium, magnesium or lithium in order to increase the etching speed. It has also been proposed to use aluminum foils with relatively small content of irons, silicon or copper. Finally, it has also been proposed to use a foil of high purity aluminum which contains a small proportion of nickel, palladium or platinum, in order to increase the etch ratio of the foil.

It is an object of the present invention to provide an etched metal foil for electrolytic capacitors and the like which can be produced in a simple and economical manner and which will have a very high etch ratio.

Other objects and advantages of the present invention will become apparent from a further reading of the description and of the appended claims.

With the above and other objects in view, the present invention contemplates an etched metal foil for electrolytic capacitors and the like consisting of between 0.0001% and 1% silver, the balance being aluminum having a purity of at least 99.99%.

Surprisingly it has been found that according to the present invention a very significant increase in the etch ratio can be achieved by etching a foil consisting of high purity aluminum with a small proportion of silver. The etched metal foil according to the present invention thus will consist of between 0.0001% and 1%, preferably between 0.001 and 0.01% silver, the balance being high purity aluminum.

Experiments have shown that the etching ratio which in the case of an unalloyed high purity aluminum foil will at best reach a value of about 8, can be increased to about 8.9 by etching a foil consisting according to the present invention of high purity aluminum and the above mentioned proportions of silver, when etching both types of foils under equal conditions. Thus, the increase in the etch ratio of the foil according to the present invention as compared with a foil of unalloyed high purity aluminum is more than 10 percent. Furthermore, it was found that upon etching in an acid bath, the time required for obtaining a desired etch ratio will be considerably shorter in the case of a foil according to the present invention than in the case of an unalloyed foil of high purity aluminum. This is of particular advantage in the case of electrolytic etching since thereby the period of immersion in the electrolyte is shortened and also a saving of electric current is achieved.

The etching of the aluminum foil according to the present invention, i.e., a foil consisting of an alloy of high purity aluminum and between 0.0001% and 1%, preferably between 0.001% and 0.01% silver may be carried out in substantially conventional manner, for instance by pickling the foil in sodium hydroxide solution, thereafter rinsing the foil and then subjecting the foil for 110 seconds in a bath maintained at 30° C. and having the following composition: 400 cm.$^3$ 32% hydrochloric acid, 100 cm.$^3$ concentrated nitric acid, 100 grams ferric chloride and 1 liter water, the bath also containing 15 grams aluminum cations. After this first etching step, the etching is continued for 120 seconds in a bath maintained at 25° C. and consisting of 10% aqueous hydrochloric acid which contains about 10 grams of aluminum cations per liter. Thereafter the etching is completed. It is noted, however, that the present invention is not limited to any specific manner or method of carrying out the etching of the high purity aluminum-silver foil.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An etched metal foil for electrolytic capacitors and the like consisting of between 0.0001% and 1% silver, the balance being aluminum having a purity of at least 99.99%.

2. An etched metal foil for electrolytic capacitors and the like consisting of between 0.001% and 0.01% silver, the balance being aluminum having a purity of at least 99.99%.

References Cited by the Examiner
UNITED STATES PATENTS

| 1,668,863 | 5/1928 | Morrison | 75—138 |
| 2,886,432 | 5/1959 | Schmitt et al. | 75—138 |

FOREIGN PATENTS

| 734,524 | 8/1955 | Great Britain. |

DAVID L. RECK, Primary Examiner.
R. O. DEAN, Assistant Examiner.